US008942560B2

(12) United States Patent
Hirth et al.

(10) Patent No.: US 8,942,560 B2
(45) Date of Patent: Jan. 27, 2015

(54) ETHERNET PASSIVE OPTICAL NETWORK WITH REPORT THRESHOLD CALCULATIONS

(75) Inventors: Ryan Edgar Hirth, Windsor, CA (US); Glen Kramer, Petaluma, CA (US); Mitchell Gordon McGee, Petaluma, CA (US)

(73) Assignee: Broadcom Corporation, Irvine, CA (US)

( * ) Notice: Subject to any disclaimer, the term of this patent is extended or adjusted under 35 U.S.C. 154(b) by 151 days.

(21) Appl. No.: 13/417,986

(22) Filed: Mar. 12, 2012

(65) Prior Publication Data

US 2013/0177313 A1    Jul. 11, 2013

Related U.S. Application Data

(60) Provisional application No. 61/584,010, filed on Jan. 6, 2012.

(51) Int. Cl.
*H04B 10/00* (2013.01)
(52) U.S. Cl.
USPC .............................................. 398/71; 398/72
(58) Field of Classification Search
USPC .......................................... 398/45–57, 66–72
See application file for complete search history.

(56) References Cited

U.S. PATENT DOCUMENTS

| | | | |
|---|---|---|---|
| 7,653,084 B2 * | 1/2010 | Shin et al. ...................... 370/468 |
| 8,068,731 B2 * | 11/2011 | Peng et al. ...................... 398/58 |
| 8,078,057 B2 * | 12/2011 | Wang .............................. 398/99 |
| 8,126,010 B2 * | 2/2012 | Haran et al. .................. 370/468 |
| 8,346,083 B2 * | 1/2013 | Murayama et al. ............. 398/72 |
| 2005/0249497 A1 * | 11/2005 | Haran et al. .................... 398/58 |
| 2010/0027997 A1 * | 2/2010 | Haran et al. .................... 398/58 |
| 2010/0254707 A1 * | 10/2010 | Peng et al. ...................... 398/58 |
| 2010/0322634 A1 * | 12/2010 | Murayama et al. ............. 398/98 |
| 2011/0182579 A1 * | 7/2011 | Haran et al. .................... 398/58 |
| 2011/0318009 A1 * | 12/2011 | Shiba .............................. 398/67 |
| 2013/0177313 A1 * | 7/2013 | Hirth et al. ..................... 398/66 |

\* cited by examiner

*Primary Examiner* — Agustin Bello
(74) *Attorney, Agent, or Firm* — Sterne, Kessler, Goldstein & Fox P.L.L.C.

(57) ABSTRACT

The present disclosure is directed to a method and apparatus for maintaining sub-queues at an ONU and for maintaining a count of an amount of data stored in each sub-queue or a count of an amount of data associated with elements stored in each sub-queue. The sub-queues represent partitions in a first in, first out (FIFO) queue used by the ONU to buffer packets, or elements that are associated with packets, to be sent upstream. The sub-queues are coupled in series such that the output of a first sub-queue feeds the input of a second sub-queue, the output of the second sub-queue feeds the input of a third sub-queue, etc. Each sub-queue has a defined threshold that sets a maximum amount of packet data it can buffer or the elements in which it buffers can be associated with.

8 Claims, 8 Drawing Sheets

ETHERNET PASSIVE OPTICAL NETWORK WITH REPORT THRESHOLD CALCULATIONS

CROSS REFERENCE TO RELATED APPLICATIONS

This application claims the benefit of U.S. Provisional Patent Application No. 61/584,010, filed Jan. 6, 2012, which is incorporated herein by reference in its entirety.

FIELD OF THE INVENTION

This application relates generally to maintenance of upstream queues and, more particularly to maintenance of upstream queues in a passive optical network (PON).

BACKGROUND

The portion of the public network from a central office to an end user's location is called the access network or "last mile." The access network connects the end user to a backbone or core network via the central office. To keep pace with increasing voice, data, and video traffic, network operators have, in many areas, upgraded existing access networks by deploying optical fibers deeper into the last mile to shorten the lengths of existing copper and coaxial networks. Among different competing optical network technologies, passive optical networks (PONs) have been one of the favored choices for these next-generation access networks. With the large bandwidth of optical fibers, PONs can accommodate bandwidth-intensive voice, data, and video services.

FIG. 1 illustrates an exemplary PON 100 that communicatively couples a central office 110 to a single family unit (SFU) 120 and a multi-dwelling unit (MDU) 130 (i.e., a structure housing two or more residential or business units). Transmissions within PON 100 are specifically performed between an optical line terminal (OLT) at central office 110 and optical network units (ONUs) at SFU 120 and MDU 130 over optical fibers that span the distance between them. The OLT at central office 110 couples PON 100 at its end to a backbone or core network (not shown), which can be an external network belonging to, for example, an Internet service provider (ISP) or a local exchange carrier. In addition, the ONUs at SFU 120 and MDU 130 further couple PON 100 at their ends to home or business networks (also not shown). This network structure allows end user devices coupled to the home or business networks within SFU 120 and MDU 130 to send data to, and receive data from, the backbone or core network over PON 100.

The portion of PON 100 closest to central office 110 is commonly referred to as the feeder area 150. This area includes one or more feeder cables that each has multiple fibers. Passive optical splitters/combiners 140 are used to split the individual fibers of the feeder cables into multiple distribution fibers that fall within the second portion of PON 100, which is commonly referred to as the distribution area 160. The distribution fibers are then further split by additional passive optical splitters/combiners 140 into multiple drop fibers that extend to SFU 120 and MDU 130. The drop fibers fall within the third and final portion of PON 100, which is commonly referred to as the drop area 170.

It should be noted that PON 100 illustrates only one exemplary PON and fiber distribution topology (i.e., a tree topology) and that other point-to-multipoint fiber distribution topologies, such as ring and mesh topologies, are possible.

In prior access networks, distribution area 160 and/or drop area 170 were deployed using copper and coaxial cables. By extending fiber cables deeper into the access network, all the way to the home, building, or curb, for example, PON 100 can accommodate bandwidth-intensive voice, data, and video services that these prior access networks could not handle. As illustrated in FIG. 1, the only remaining portion of the network between central office 110 and an end user's device at SFU 120 and MDU 130 that potentially is not optically connected is within the local area networks at these locations (i.e., within metallic area 180). Over such short copper and/or coaxial wiring distances, current local area network technology generally provides adequate bandwidth.

During operation of the access network illustrated in FIG. 1, signals sent down stream over the three portions of PON 100 by the OLT at central office 110 are split by passive optical splitters/combiners 140 and are received by the ONUs at SFU 120 and MDU 130. Conversely, signals sent upstream over the three portions of PON 100 by the ONUs at SFU 120 and MDU 130 are combined by passive optical splitters/combiners 140 and are received by the OLT at central office 110. To prevent collisions in the upstream direction and to share the upstream capacity of PON 100 fairly, the OLT at central office 110 and the ONUs at SFU 120 and MDU 130 implement some form of arbitration mechanism.

For example, many PONs implement a non-contention based media access scheme that grants each ONU access to the shared medium for a limited interval of time for transmitting data upstream. This limited interval of time is commonly referred to as a time slot. FIG. 2 illustrates an example of data being sent upstream over a PON in accordance with such a non-contention based media access scheme. In FIG. 2, each ONU 1 through N is synchronized to a common time reference and is allocated a timeslot for transmitting one or more packets of data upstream to the OLT. More specifically, each ONU 1 through N buffers packets received from an attached end user (or users) and bursts one or more of the buffered packets upstream to the OLT when its assigned timeslot arrives. For example, ONU 1 receives two packets of data from attached user 1, buffers the two packets of data, and bursts the two packets upstream during a first timeslot assigned to ONU 1. ONU 2 receives a single packet of data from attached user 2, buffers the packet of data, and bursts the single packet upstream during a second timeslot assigned to ONU 2. As can be seen from FIG. 2, the time slots are assigned to the ONUs such that they do not overlap in time, thereby preventing upstream collisions.

Beyond simply assigning time slots such that they do not overlap in time, the exact method of when and how much capacity is granted to a particular ONU in such a non-contention based media access scheme can greatly affect the performance of the PON. In most conventional PONs, each ONU is either assigned a static time slot of fixed capacity within a repeating interval (i.e., in accordance with a static TDMA scheme) or are dynamically assigned timeslots of varying capacities based on the instantaneous amount of data buffered by the ONUs (i.e., in accordance with a dynamic bandwidth allocation (DBA) scheme).

Static TDMA schemes are advantageous because ONUs are guaranteed a predetermined, fixed amount of upstream bandwidth. However, the inflexibility of the amount of upstream bandwidth assigned to each ONU using static TDMA often leads to inefficient use of upstream bandwidth—ONUs with little or no data to transmit upstream are still allocated their fixed share of bandwidth even though other ONUs may be waiting to send large amounts of data upstream. In other words, static TDMA does not allow unused upstream bandwidth to be transferred to ONUs that can make use of the excess bandwidth. DBA schemes, on the other hand, allow upstream bandwidth to be more efficiently allocated to, and shared by, ONUs based on need and other factors.

In a PON implementing a DBA scheme, the OLT is responsible for allocating upstream grants (or timeslots) to each ONU. An ONU defers its upstream transmissions until it receives a grant from the OLT. In order to receive a grant, an ONU generates and transmits an upstream message to the OLT called a REPORT message that informs the OLT of its respective upstream queue status. The OLT uses this information sent from each ONU requesting upstream bandwidth to generate and transmit GATE messages to those ONUs. Each GATE message allocates an upstream transmission grant to an ONU based on its upstream bandwidth needs and the upstream bandwidth needs of other ONUs.

In Ethernet PONs (EPONs), the packets buffered by the upstream queues of the ONUs are Ethernet frames, which generally cannot be fragmented. Therefore, if an OLT allocates an upstream transmission grant to an ONU that is less than the total amount of data buffered by its upstream queue, or allocates an upstream transmission grant that does not fall on a boundary of an Ethernet frame in its upstream queue, some of the upstream bandwidth may go to waste. FIG. 3 provides a specific illustration of this, where an ONU is provided with an upstream transmission grant 310 that is less than the total amount of data buffered by its upstream queue 320 and does not fall on a boundary of an Ethernet frame in its upstream queue 320. The upstream transmission grant 310 is sufficient to transmit all of frames 1-3 in upstream queue 320, but is not sufficient to transmit all of frame 4. Because frames in upstream queue 320 cannot be fragmented, there is an upstream bandwidth loss 330.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

I. Overview

The present disclosure, in at least one embodiment, is directed to a method and apparatus for maintaining sub-queues at an ONU and for maintaining a count of an amount of data stored in each sub-queue. The sub-queues represent partitions in a first in, first out (FIFO) queue used by the ONU to buffer packets to be sent upstream. The sub-queues are coupled in series such that the output of a first sub-queue feeds the input of a second sub-queue, the output of the second sub-queue feeds the input of a third sub-queue, etc. Each sub-queue has a defined threshold that sets a maximum amount of data it can buffer.

In an EPON implementation, the packets buffered by the sub-queues are Ethernet frames. To reduce upstream bandwidth waste due to fragmentation issues as described above, the method and apparatus do not add an Ethernet frame to a sub-queue unless there is adequate space available in the sub-queue for the entire, additional Ethernet frame (i.e., there is adequate space below the sub-queue's defined threshold for the entire, additional Ethernet frame). As a result, when the ONU reports a count of an amount of data stored in one or more of the sub-queues to the OLT, the amount of data reported for each sub-queue falls on an Ethernet frame boundary. The OLT can use this reported information to efficiently grant upstream bandwidth to the ONU for transmitting data stored in one or more of its sub-queues.

Further features and embodiments of the method and apparatus of the present disclosure are described below in regard to FIG. 4-9.

II. Exemplary ONU

Figure 1:
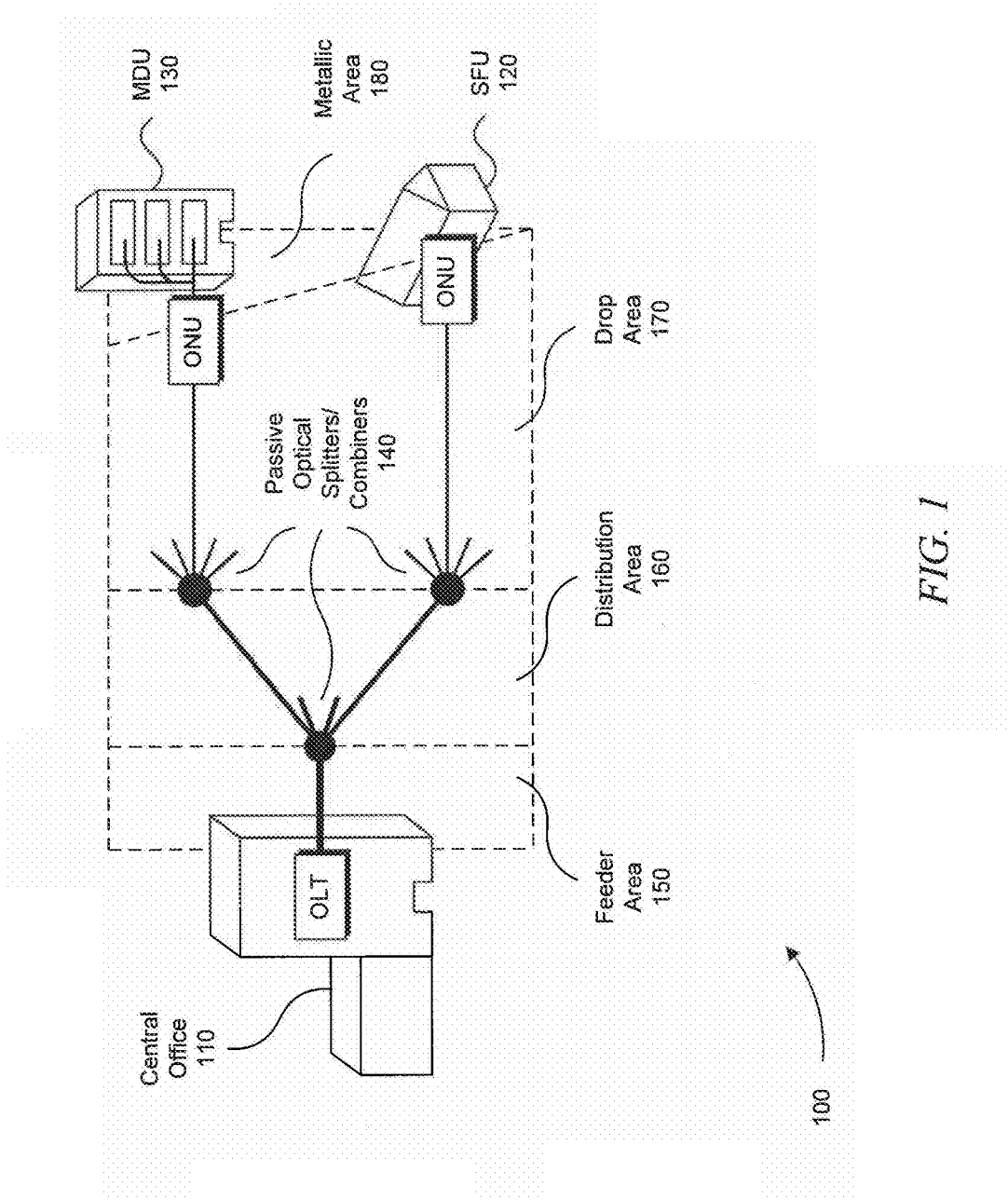
FIG. 1 illustrates an exemplary PON.
Figure 2:
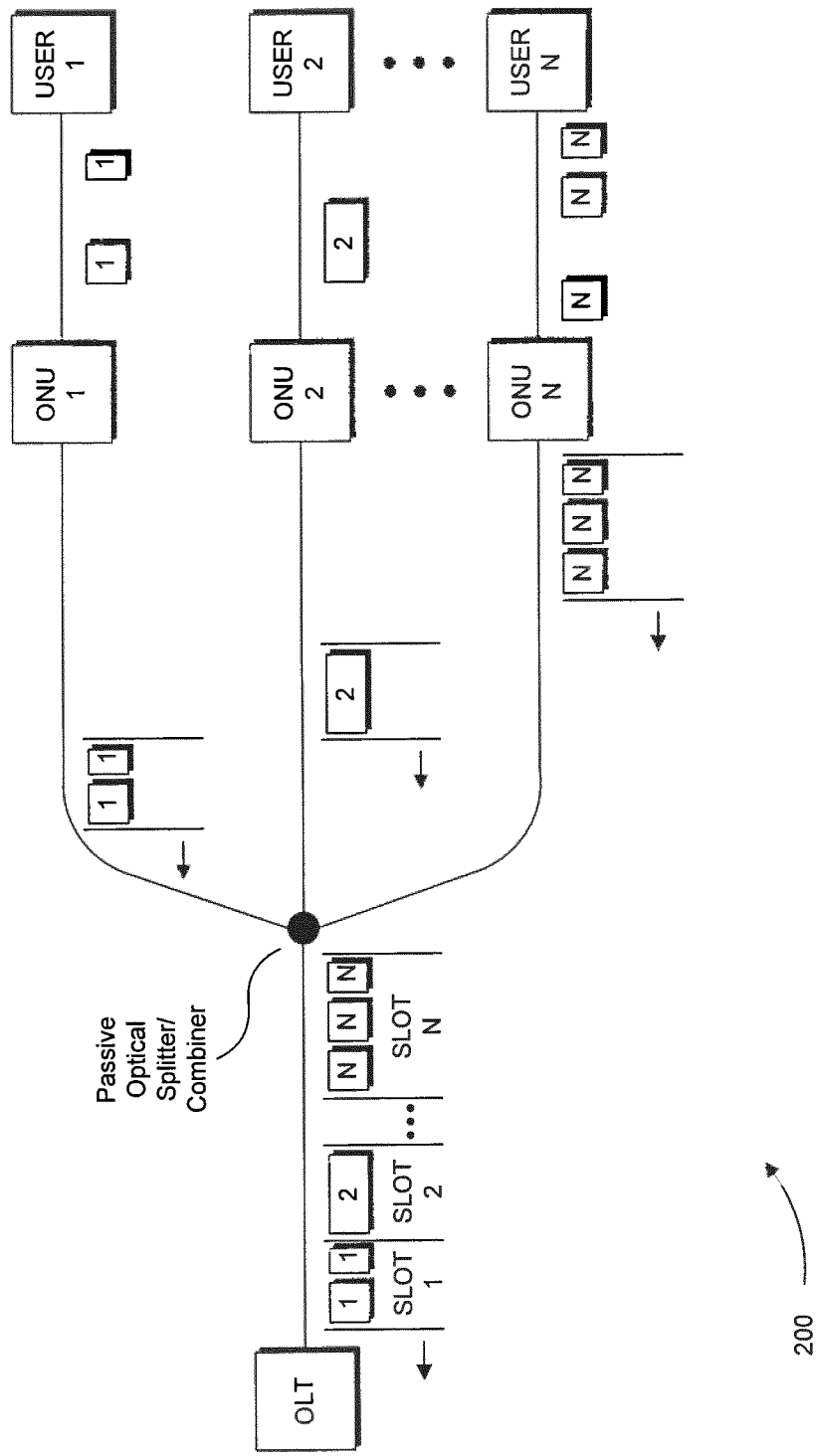
FIG. 2 illustrates data being sent upstream over a PON in accordance with a non-contention based media access scheme.
Figure 3:
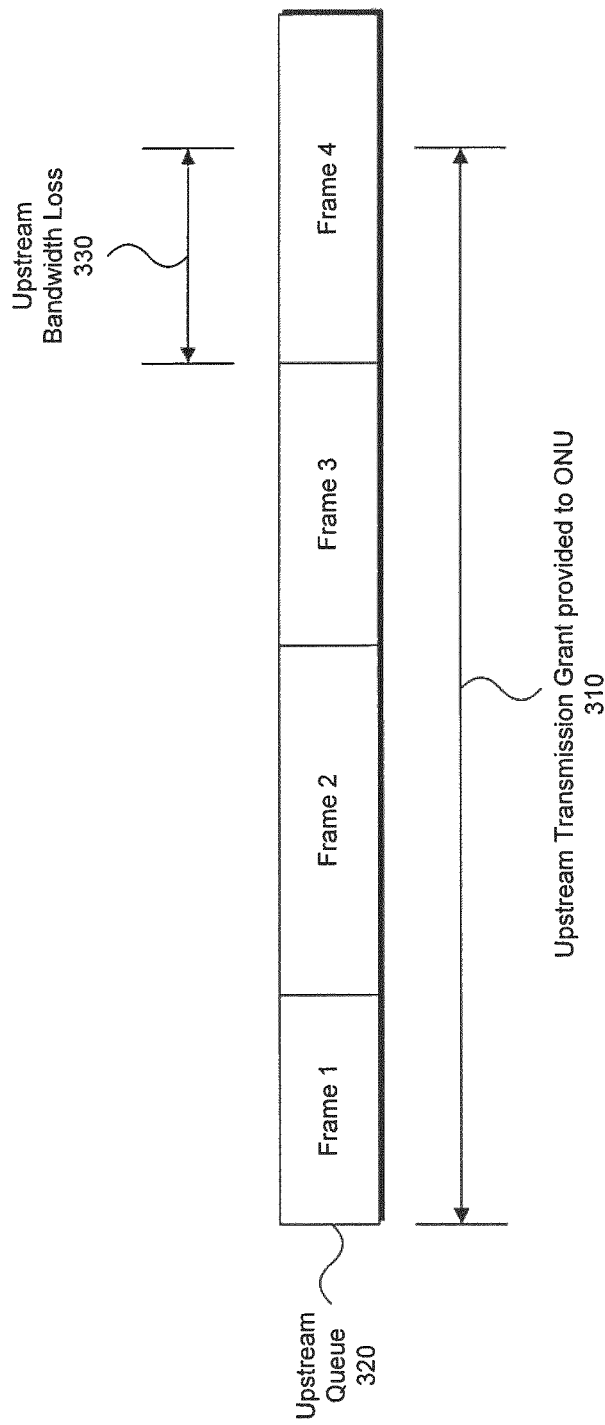
FIG. 3 illustrates bandwidth loss in a PON due to the inability of Ethernet frames to be fragmented for upstream transmission.
Figure 4:
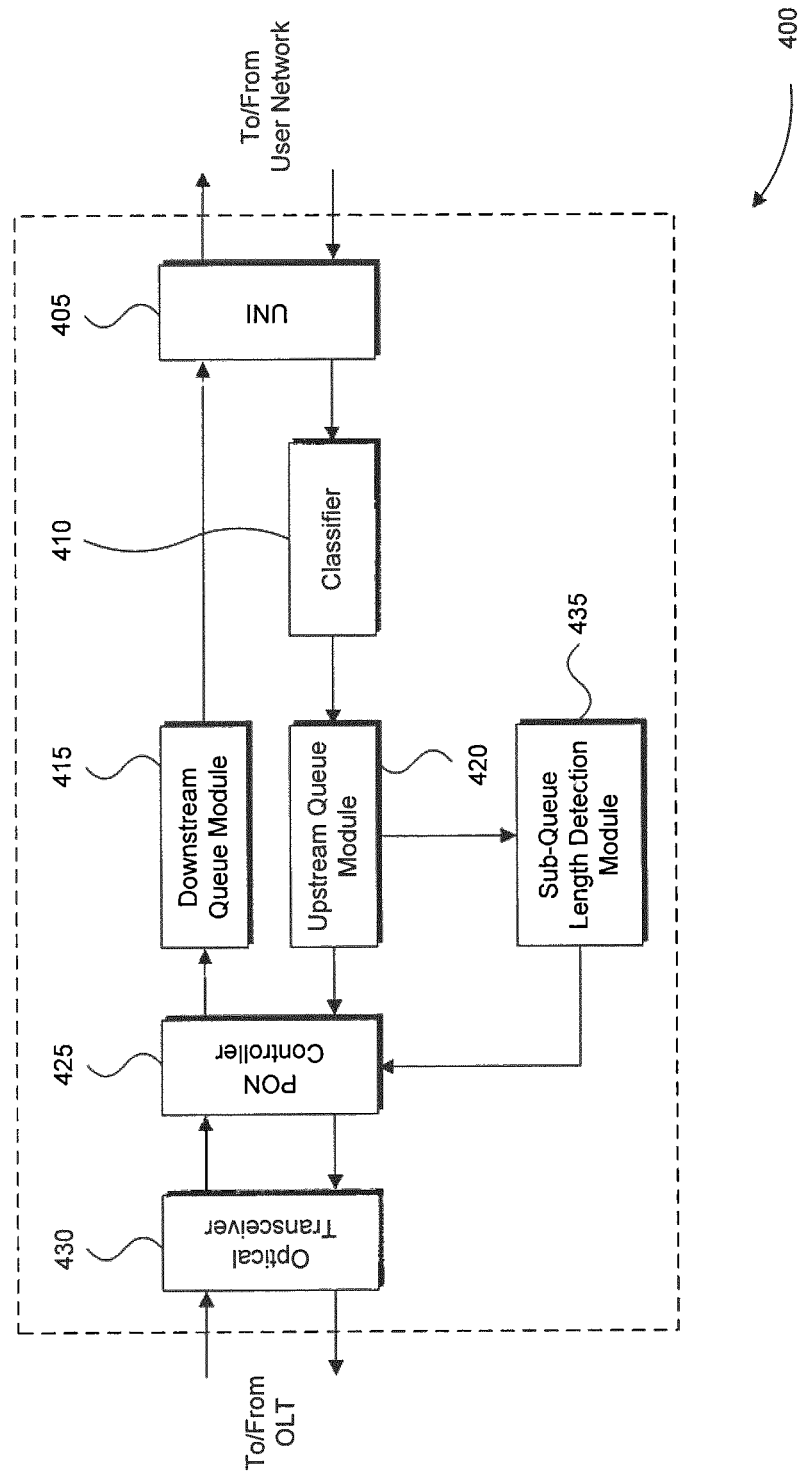
FIG. 4 illustrates an exemplary block diagram of an ONU in accordance with embodiments of the present disclosure.

Referring now to FIG. 4, an exemplary ONU 400 in which embodiments of the present disclosure can be implemented is illustrated. ONU 400 includes a user network interface (UNI) 405, a classifier 410, a downstream queue module 415, an upstream queue module 420, a PON controller 425, an optical transceiver 430, and a sub-queue length detection module 435.

In the downstream direction, optical transceiver 430 receives an optical signal transmitted from an OLT over a PON. Data in the form of packets are recovered from the optical signal and are provided to PON controller 425 in an electrical format. PON controller 425 determines whether the packets are addressed to ONU 400 by, for example, examining each packet for a logical link identifier (LLID). If the LLID of the packet matches the LLID (or one of the LLIDs) assigned to ONU 400, the packet is accepted and is passed on to downstream queue module 415 for buffering. If, on the other hand, the packet does not match the LLID (or one of the LLIDs) assigned to ONU 400, the packet is discarded by PON controller 425. The packets buffered in downstream queue module 415 are subsequently transmitted to the user network via UNI 405.

In the upstream direction, packets of data to be transmitted to the OLT over the PON are initially received from the user network via UNI 405. Classifier 410 (optionally included in ONU 400) classifies the packets into a priority class based on the type of content the packets are carrying. For example, packets carrying voice or video data can be classified into a priority class characterized by small transmission delays (e.g., a high priority class), whereas packets carrying data other than voice or video can be classified into a priority class characterized by requiring only best effort transmission (e.g., a low priority class).

Assuming that classifier 410 is included in ONU 400, upstream queue module 420 will include a plurality of upstream queues, each with a designated priority level. Classifier 410 can insert a packet received from the user network via UNI 405 into one of the plurality of upstream queues with a designated priority corresponding to the packet's priority classification. The packets are specifically inserted into a tail end of an upstream queue and are removed from a head end of the upstream queue in the order in which they were inserted. In other words, the upstream queues included in upstream queue module 420 are first in, first out (FIFO) queues.

Once removed from an upstream queue, the packets and generally sent upstream over the PON coupled to ONU 400. However, as mentioned briefly above, the channel capacity of a PON, such as the PON coupled to ONU 400, is typically shared by multiple ONUs in the upstream direction. As a result, upstream transmissions from each ONU attached to the PON are arbitrated to avoid collisions. This arbitration can be achieved by having the OLT allocate grants (also called time slots) to each ONU. In this scheme, an ONU defers upstream data transmissions until it receives a grant from the OLT. In order to receive a grant, an ONU generates and transmits an upstream message to the OLT called a REPORT message that informs the OLT of the respective status of its upstream queues. The OLT uses this information sent from each ONU requesting upstream bandwidth to generate and transmit GATE messages to those ONUs. Each GATE message allocates an upstream transmission grant to an ONU based on its upstream bandwidth needs and the upstream bandwidth needs of other ONUs.

In ONU 400, PON controller 425 generates a REPORT message as described above and transmits it upstream to the OLT to which it is coupled. PON controller 425 specifically includes in its REPORT message a count of an amount of data stored in partitions, referred to as sub-queues, of one or more of the upstream queues included in upstream queue module 420. The sub-queues of an upstream queue are coupled in series such that the output of a first one of the sub-queues feeds the input of a second one of the sub-queues, the output of the second one of the sub-queues feeds the input of a third one of the sub-queues, etc. Each sub-queue has a defined threshold that sets a maximum amount of data it can buffer.

The use of sub-queues with defined thresholds can help to reduce upstream bandwidth waste due to fragmentation issues in, for example, Ethernet PONs (EPONs), where the upstream packets are Ethernet frames that typically cannot be fragmented. An Ethernet frame is not added to a sub-queue unless there is adequate space available in the sub-queue for the entire, additional Ethernet frame. As a result, when ONU 400 reports a count of an amount of Ethernet frame data stored in a sub-queue to the OLT, the amount of Ethernet frame data reported for the sub-queue falls on an Ethernet frame boundary. The OLT can use this information included in the REPORT message to efficiently grant upstream bandwidth to ONU 400 for transmitting the Ethernet frame data stored in the sub-queues upstream.

Sub-queue length detection module 435 is specifically configured to maintain a count for each sub-queue that reflects an amount of Ethernet frame data stored in a particular sub-queue and provide the count for one or more of the sub-queues to PON controller 425 for inclusion in the REPORT message.

Described further below are two exemplary implementations of upstream queue module 420 and sub-queue length detection module 435.

III. First Implementation

Figure 5:
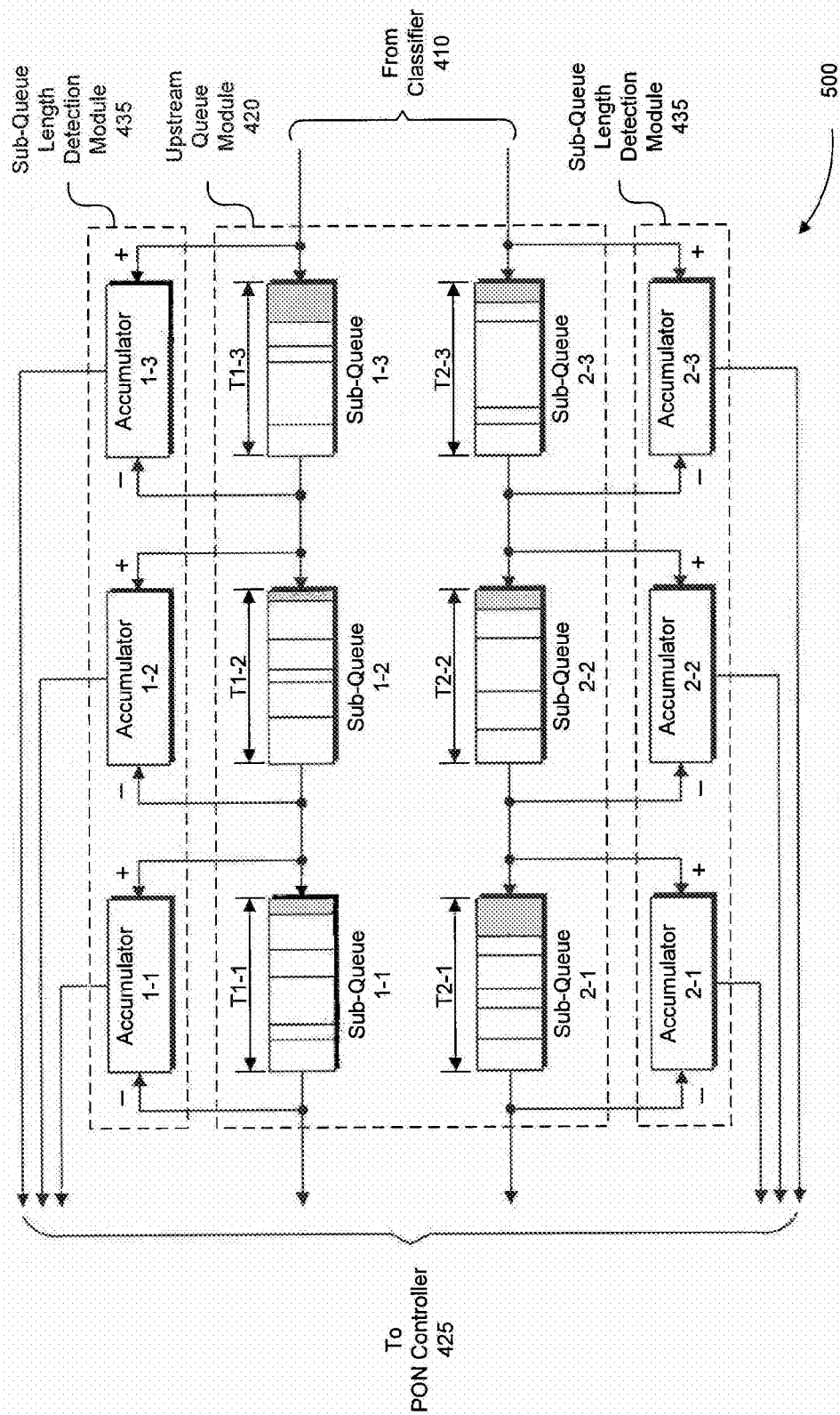
FIG. 5 illustrates an exemplary block diagram of upstream queues in an ONU and a sub-queue length detection module in an ONU in accordance with embodiments of the present disclosure.

FIG. 5 illustrates a first implementation 500 of upstream queue module 420 and sub-queue length detection module 435 in accordance with embodiments of the present disclosure. As illustrated, upstream queue module 420 includes two separate upstream queues: a first upstream queue comprised of sub-queues 1-1, 1-2, and 1-3, and a second upstream queue comprised of sub-queues 2-1, 2-2, and 2-3.

Sub-queues 1-1, 1-2, and 1-3 are coupled in series such that the output of sub-queue 1-3 feeds the input of sub-queue 1-2, and the output of sub-queue 1-2 feeds the input of sub-queue 1-1. The input of sub-queue 1-3 forms the tail end of the first upstream queue included in upstream queue module 420, and the output of sub-queue 1-1 forms the head end of the first upstream queue included in upstream queue module 420. In an embodiment, the first upstream queue is designated as having a first priority level and is configured to store elements of data received from classifier 410 with a priority level corresponding to the first priority level. The elements are inserted into the tail end of the first upstream queue and are removed from the head end of the first upstream queue in the same order in which they were inserted. Thus, the first upstream queue is a FIFO queue.

Similarly, sub-queues 2-1, 2-2, and 2-3 are coupled in series such that the output of sub-queue 2-3 feeds the input of sub-queue 2-2, and the output of sub-queue 2-2 feeds the input of sub-queue 2-1. The input of sub-queue 2-3 forms the tail end of the second upstream queue included in upstream queue module 420, and the output of sub-queue 2-1 forms the head end of the second upstream queue included in upstream queue module 420. In an embodiment, the second upstream queue is designated as having a second priority level and is configured to store elements of data, received from classifier 410, with a priority level corresponding to the second priority level. The elements are inserted into the tail end of the second upstream queue and removed from the head end of the second upstream queue in the same order in which they were inserted. Thus, the second upstream queue is a FIFO queue.

Elements inserted and removed from the first and second upstream queues are associated with packets. An element can be associated with a packet by, for example, including a reference (e.g., a pointer) to an address in memory where the packet is stored and/or by including the actual packet. In an embodiment, the packets associated with the elements inserted and removed from the first and second upstream queues are Ethernet frames that cannot be fragmented into multiple, smaller frames for transmission upstream over a PON.

Each sub-queue in upstream queue module 420 has a defined threshold that sets a maximum, cumulative length (e.g., in bytes or bits) of packet data that the elements, buffered by a sub-queue, can be associated with. In other words, the sum of the lengths of the packets associated with elements stored in a sub-queue cannot exceed the sub-queue's defined threshold. As illustrated in FIG. 5, sub-queue 1-1 has a defined threshold T1-1, sub-queue 1-2 has a defined threshold T1-2, sub-queue 1-3 has a defined threshold T1-3, etc.

PON controller 425 is configured to control the insertion and removal of elements from the sub-queues in upstream queue module 420. PON controller inserts an element into a sub-queue if the addition of the element to the sub-queue does not push the sum of the lengths of the packets associated with elements stored in the sub-queue above the sub-queue's defined threshold. If the addition of the element to the sub-queue will push the sum of the lengths of the packets associated with elements stored in the sub-queue above the sub-queue's defined threshold, then the element is not inserted until elements stored in the sub-queue are removed, creating adequate space below the threshold for the additional element. As a result, when ONU 400 reports a count (maintained by an accumulator in sub-queue length detection module 435) of a cumulative length of the packets associated with elements stored in a sub-queue to the OLT, the count reported falls on a packet boundary. The OLT can use this information included in the REPORT message to efficiently grant upstream bandwidth to ONU 400 for transmitting the packet data stored in the sub-queue, or associated with the elements stored in the sub-queue, upstream. For example, in the embodiment where the packets are Ethernet frames, such a scheme can prevent upstream bandwidth loss due to Ethernet frames not being permitted to be fragmented.

Referring now to sub-queue length detection module 435, this module is configured to maintain, for one or more sub-queues in upstream queue module 420, a count of a cumulative length of the packets associated with elements stored in the sub-queue. For example, sub-queue length detection module 435 uses accumulator 1-1 to maintain a count of a cumulative length of the packets associated with elements stored in sub-queue 1-1. As an element is inserted into the tail end of sub-queue 1-1, the count maintained by accumulator 1-1 is increased based on the length of the packet associated with the inserted element. Conversely, as an element is removed from a head end of sub-queue 1-1, the count maintained by accumulator 1-1 is decreased based on the length of the packet associated with the element removed. The count maintained by accumulator 1-1 can be provided to PON controller 425 for reporting to the OLT. In addition, the count maintained by accumulator 1-1 can be provided to PON controller 425 to determine whether an additional element can be added to sub-queue 1-1 as described above.

Accumulators 1-2, 1-3, 2-1, 2-2, and 2-3 are configured to maintain a count of a cumulative length of packets associated with elements stored in their corresponding sub-queues in a similar manner as accumulator 1-1. The maintained count values can be further used in a similar manner as the count maintained by accumulator 1-1.

It should be noted that the number of upstream queues, and the number of sub-queues included in each of the upstream queues shown in upstream queue module 420, is for illustration purposes only. One of ordinary skill in the art will recognize that more or less upstream queues can be included in upstream queue module 420, and each upstream queue can include more or less sub-queues. It should be further noted that, in the embodiment where the sub-queues store Ethernet frames, the count values maintained by sub-queue length detection module 435 for each sub-queue can include or reflect the amount of overhead data (e.g., in bytes or bits) associated with Ethernet frames. Overhead data associated with an Ethernet frame can specifically include, for example, a preamble and an inter-frame gap (IFG).

IV. Second Implementation

Figure 6:
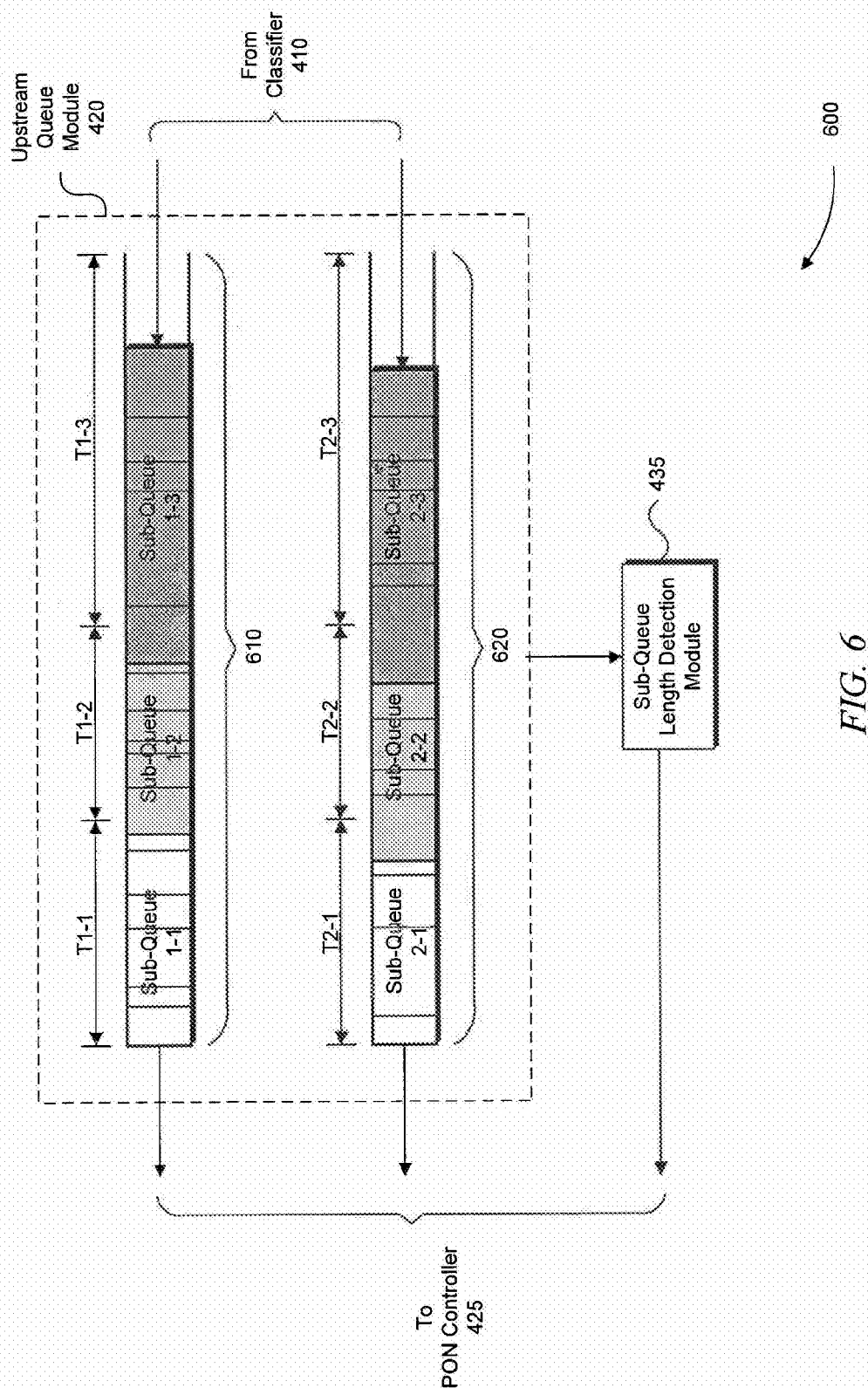
FIG. 6 illustrates another exemplary block diagram of upstream queues in an ONU and a sub-queue length detection module in an ONU in accordance with embodiments of the present disclosure.

FIG. 6 illustrates a second implementation 600 of upstream queue module 420 and sub-queue length detection module 435 in accordance with embodiments of the present disclosure. As illustrated, upstream queue module 420 includes two separate upstream queues: a first upstream queue comprised of sub-queues 1-1, 1-2, and 1-3, and a second upstream queue comprised of sub-queues 2-1, 2-2, and 2-3.

Unlike the first implementation of upstream queue module 420 illustrated in FIG. 5, upstream queue module 420 illustrated in FIG. 6 does not include a separate data structure for each sub-queue. Rather, the sub-queues for each upstream queue are included within a single data structure. In particular, sub-queues 1-1, 1-2, and 1-3 are included in a first data structure 610, and sub-queues 2-1, 2-2, and 2-3 are included in a second data structure 620.

Sub-queues 1-1, 1-2, and 1-3 are coupled in series such that the output of sub-queue 1-3 feeds the input of sub-queue 1-2, and the output of sub-queue 1-2 feeds the input of sub-queue 1-1. The input of sub-queue 1-3 forms the tail end of the first upstream queue included in upstream queue module 420, and the output of sub-queue 1-1 forms the head end of the first upstream queue included in upstream queue module 420. In an embodiment, the first upstream queue is designated as having a first priority level and is configured to store elements of data received from classifier 410 with a priority level corresponding to the first priority level. The elements are inserted into the tail end of the first upstream queue and are removed from the head end of the first upstream queue in the same order in which they were inserted. Thus, the first upstream queue is a FIFO queue.

Similarly, sub-queues 2-1, 2-2, and 2-3 are coupled in series such that the output of sub-queue 2-3 feeds the input of sub-queue 2-2, and the output of sub-queue 2-2 feeds the input of sub-queue 2-1. The input of sub-queue 2-3 forms the tail end of the second upstream queue included in upstream queue module 420, and the output of sub-queue 2-1 forms the head end of the second upstream queue included in upstream queue module 420. In an embodiment, the second upstream queue is designated as having a second priority level and is configured to store elements of data, received from classifier 410, with a priority level corresponding to the second priority level. The elements are inserted into the tail end of the second upstream queue and removed from the head end of the second upstream queue in the same order in which they were inserted. Thus, the second upstream queue is a FIFO queue.

Elements inserted and removed from the sub-queues of upstream queue module 420 are associated with packets. An element can be associated with a packet by, for example, including a reference (e.g., a pointer) to an address in memory where the packet is stored and/or by including the actual packet. In an embodiment, the packets associated with the elements inserted and removed from first upstream queue and second upstream queue are Ethernet frames that cannot be fragmented into multiple, smaller frames for transmission upstream over a PON.

In addition to being associated with a packet, elements inserted and removed from the sub-queues of upstream queue module 420 are associated with cumulative count values. A cumulative count value associated with an element is determined based on a sum of the lengths of the packets associated with ones of the elements stored closer to a head of the upstream queue than the particular element. For example, the cumulative count value associated with the third element stored closest to the head in an upstream queue can be determined based on the sum of the lengths of the packets associated with the two elements stored closer to the head of the upstream queue. An element can be associated with a cumulative count value by, for example, including a reference (e.g., a pointer) to an address in memory where the cumulative count value is stored and/or by including the actual cumulative count value. It should be noted that, in the embodiment where the packets are Ethernet frames, the cumulative count values can include or reflect the amount of overhead data (e.g., in bytes or bits) associated Ethernet frames. Overhead data associated with an Ethernet frame can specifically include, for example, a preamble and an inter-frame gap (IFG).

Each sub-queue in upstream queue module 420 has a defined threshold that sets a maximum, cumulative length (e.g., in bytes or bits) of packet data that the elements, buffered by the sub-queue, can be associated with. In other words, the sum of the lengths of the packets associated with the elements stored in a sub-queue cannot exceed the sub-queue's defined threshold. As illustrated in FIG. 5, sub-queue 1-1 has a defined threshold T1-1, sub-queue 1-2 has a defined threshold T1-2, sub-queue 1-3 has a defined threshold T1-3, etc.

Sub-queue length detection module 435, illustrated in FIG. 6, is configured to determine a current, cumulative length of the packets associated with the elements stored in a sub-queue by searching for an element in the upstream queue of the sub-queue that is: (1) closest to the tail end of the upstream queue, and (2) has an associated cumulative count value that is less than the defined threshold of the sub-queue. This searching process, performed by sub-queue length detection module 435, is best understood with reference to an example.

Figure 7:
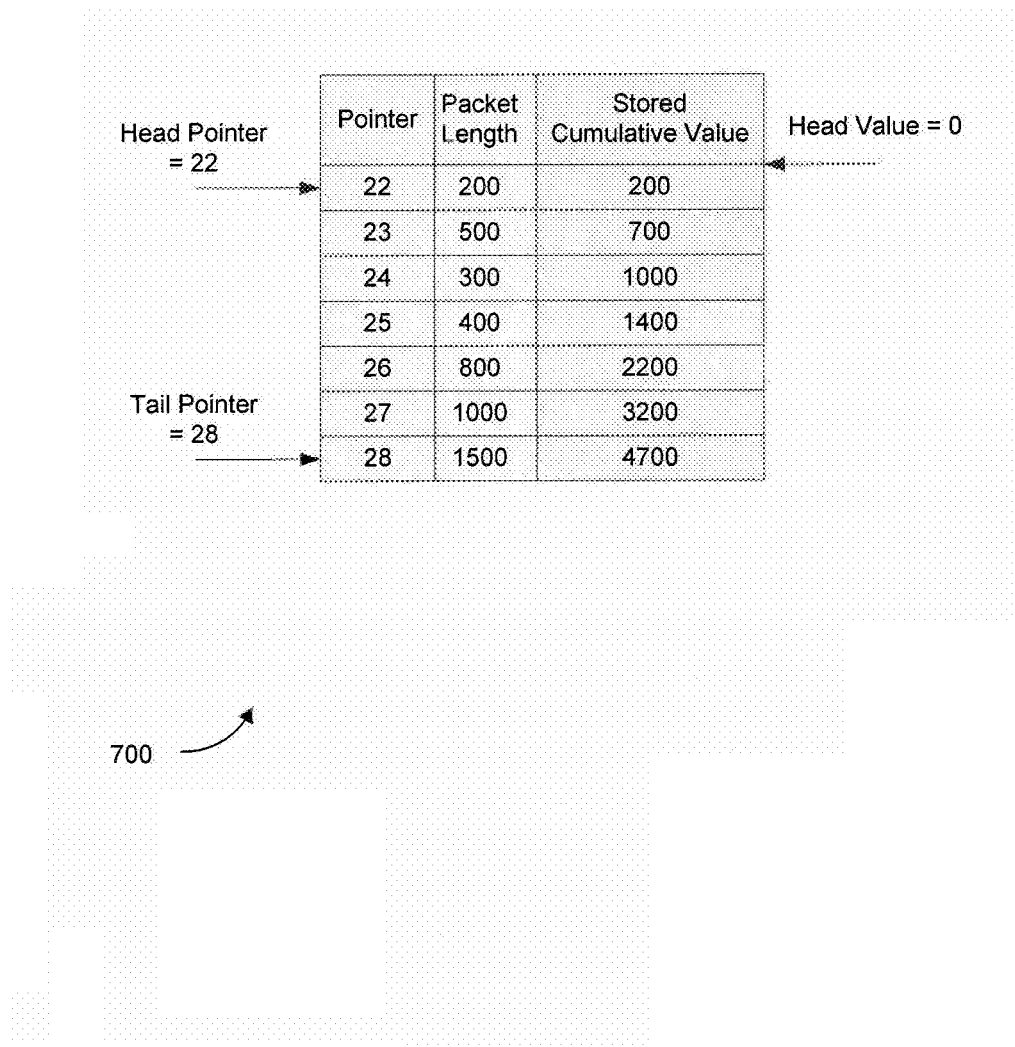
FIG. 7 illustrates exemplary contents of a FIFO queue in an ONU in accordance with embodiments of the present disclosure.

For this purpose, FIG. 7 illustrates a table 700 that shows the cumulative count values associated with a series of elements stored in the first upstream queue in upstream queue module 420. Assuming that the first sub-queue in the first upstream queue has a defined threshold of 2000 bytes, sub queue length detection module 435 can determine a current, cumulative length of the packets associated with the elements stored in the first sub-queue by searching for an element in the contents of the first upstream queue, illustrated by table 700, that is: (1) closest to the tail end of the first upstream queue, and (2) has an associated cumulative count value that is less than the first sub-queue's defined threshold of 2000 bytes. Sub-queue length detection module 435 can search for the element stored in the first upstream queue having the two properties noted above using, for example, a binary search method or any other reasonable search method.

After searching, sub-queue length detection module 435 will find that the element stored at pointer 25 in the upstream queue is the element that is (1) closest to the tail end of the first upstream queue, and (2) has an associated cumulative count value that is less than 2000 bytes (i.e., less than the defined threshold of the first sub-queue). The cumulative count value associated with the element stored at pointer 25 is, in at least this example, the current, cumulative length of the packets associated with the elements stored in the first sub-queue. Thus, the current, cumulative length of the packets associated with the elements stored in the first sub-queue is equal to 1400 bytes. This same search process can be performed by sub-queue length detection module 435 for each sub-queue in the upstream queue.

It should be noted that, as the search process is performed by sub-queue length detection module 435 for a sub-queue, the associated cumulative count values for elements stored in an upstream queue can (and typically should) be adjusted downward based on the associated cumulative count value of the last element stored in the immediately preceding sub-queue or the last element removed from the sub-queue. Thus, taking the example discussed above again in regard to table 700, assuming that the associated cumulative count value of the element last read out of the first sub-queue in the first upstream queue was 400 instead of zero, the associated cumulative count value for each element in the first sub-queue should be adjusted downward by 400.

The current, cumulative length of the packets associated with the elements stored in sub-queues of upstream queue module 420 are provided to PON controller 425 for inclusion in a REPORT message to be sent upstream to an OLT as described above. For example, for the first upstream queue, the cumulative length of sub-queue 1-1 can be included in the REPORT message, the cumulative length of sub-queue 1-1 plus the cumulative length of sub-queue 1-2 can be included in the REPORT message, and the cumulative length of sub-queue 1-1 plus the cumulative length of sub-queue 1-2 plus the cumulative length of sub-queue 1-3 can be included in the REPORT message.

It should be noted that the number of upstream queues, and the number of sub-queues included in each of the upstream queues shown in upstream queue module 420, is for illustration purposes only. One of ordinary skill in the art will recognize that more or less upstream queues can be included in upstream queue module 420, and each upstream queue can include more or less sub-queues.

V. Example Computer System Implementation

It will be apparent to persons skilled in the relevant art(s) that various elements and features of the present invention, as described herein, can be implemented in hardware using analog and/or digital circuits, in software, through the execution of instructions by one or more general purpose or special-purpose processors, or as a combination of hardware and software.

Figure 8:
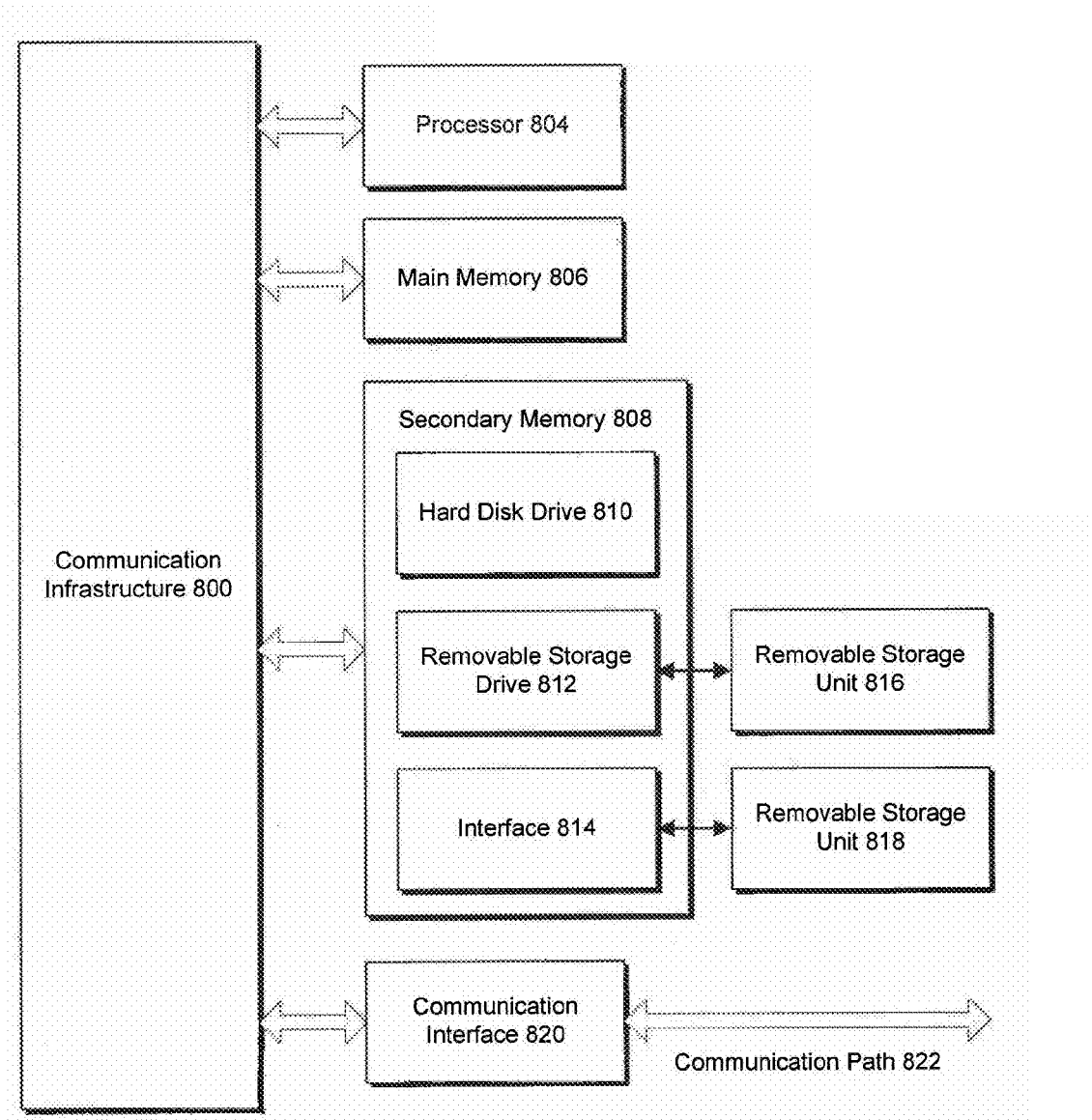
FIG. 8 illustrates an example computer system that can be used to implement aspects of the present disclosure.

The following description of a general purpose computer system is provided for the sake of completeness. Embodiments of the present invention can be implemented in hardware, or as a combination of software and hardware. Consequently, embodiments of the invention may be implemented in the environment of a computer system or other processing system. An example of such a computer system 800 is shown in FIG. 8.

Computer system 800 includes one or more processors, such as processor 804. Processor 804 can be a special purpose or a general purpose digital signal processor. Processor 804 is connected to a communication infrastructure 802 (for example, a bus or network). Various software implementations are described in terms of this exemplary computer system. After reading this description, it will become apparent to a person skilled in the relevant art(s) how to implement the invention using other computer systems and/or computer architectures.

Computer system 800 also includes a main memory 806, preferably random access memory (RAM), and may also include a secondary memory 808. Secondary memory 808 may include, for example, a hard disk drive 810 and/or a removable storage drive 812, representing a floppy disk drive, a magnetic tape drive, an optical disk drive, or the like. Removable storage drive 812 reads from and/or writes to a removable storage unit 816 in a well-known manner. Removable storage unit 816 represents a floppy disk, magnetic tape, optical disk, or the like, which is read by and written to by removable storage drive 812. As will be appreciated by persons skilled in the relevant art(s), removable storage unit 816 includes a computer usable storage medium having stored therein computer software and/or data.

In alternative implementations, secondary memory 808 may include other similar means for allowing computer programs or other instructions to be loaded into computer system 800. Such means may include, for example, a removable storage unit 818 and an interface 814. Examples of such means may include a program cartridge and cartridge interface (such as that found in video game devices), a removable memory chip (such as an EPROM, or PROM) and associated socket, a thumb drive and USB port, and other removable storage units 818 and interfaces 814 which allow software and data to be transferred from removable storage unit 818 to computer system 800.

Computer system 800 may also include a communications interface 820. Communications interface 820 allows software and data to be transferred between computer system 800 and external devices. Examples of communications interface 820 may include a modem, a network interface (such as an Ethernet card), a communications port, a PCMCIA slot and card, etc. Software and data transferred via communications interface 820 are in the form of signals which may be electronic, electromagnetic, optical, or other signals capable of being received by communications interface 820. These signals are provided to communications interface 820 via a communications path 822. Communications path 822 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 816 and 818 or a hard disk installed in hard disk drive 810. These computer program products are means for providing software to computer system 800.

Computer programs (also called computer control logic) are stored in main memory 806 and/or secondary memory 808. Computer programs may also be received via communications interface 820. Such computer programs, when executed, enable the computer system 800 to implement the present invention as discussed herein. In particular, the computer programs, when executed, enable processor 804 to implement the processes of the present invention, such as any of the methods described herein. Accordingly, such computer programs represent controllers of the computer system 800. Where the invention is implemented using software, the software may be stored in a computer program product and loaded into computer system 800 using removable storage drive 812, interface 814, or communications interface 820.

In another embodiment, features of the invention are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

IV. Conclusion

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. An optical network unit (ONU) comprising:
a first sub-queue configured to store a first set of elements that are each associated with a frame, wherein a sum of lengths of the frames associated with the first set of elements is limited to being less than or equal to a first threshold;
a second sub-queue configured to store a second set of elements that are each associated with a frame, wherein a sum of lengths of the frames associated with the second set of elements is limited to being less than or equal to a second threshold;
a first accumulator configured to increase a first count based on lengths of frames associated with elements added to the first sub-queue and decrease the first count based on lengths of frames associated with elements removed from the first sub-queue; and
a second accumulator configured to increase a second count based on lengths of frames associated with elements added to the second sub-queue and decrease the second count based on lengths of frames associated with elements removed from the second sub-queue.

2. The ONU of claim 1, wherein a head end of the first sub-queue is coupled to a tail end of the second sub-queue.

3. The ONU of claim 2, further comprising:
a passive optical network (PON) controller configured to add an additional element to the tail end of the second sub-queue if a sum of a length of a frame associated with the additional element and the second count is less than or equal to the second threshold.

4. The ONU of claim 3, wherein the additional element is removed from the head end of the first sub-queue.

5. The ONU of claim 4, wherein the PON controller is further configured to remove the additional element from the head end of the first sub-queue if the sum of the length of the frame associated with the additional element and the second count is less than or equal to the second threshold.

6. The ONU of claim 2, wherein the PON controller is configured to report the first count and the second count to an optical line terminal (OLT).

7. The ONU of claim 1, wherein the frame associated with each element of the first set of elements corresponds to an Ethernet frame.

8. The ONU of claim 1, wherein the frame associated with each element of the second set of elements corresponds to an Ethernet frame.

* * * * *